(12) United States Patent
Vargas-Gonzalez et al.

(10) Patent No.: US 9,162,929 B2
(45) Date of Patent: Oct. 20, 2015

(54) SIC BODIES AND PROCESS FOR THE FABRICATION OF SIC BODIES

(75) Inventors: Lionel Vargas-Gonzalez, Atlanta, GA (US); Robert Speyer, Atlanta, GA (US)

(73) Assignee: VERCO MATERIALS, LLC, Atlanta, GA (US)

( * ) Notice: Subject to any disclaimer, the term of this patent is extended or adjusted under 35 U.S.C. 154(b) by 1422 days.

(21) Appl. No.: 12/629,641

(22) Filed: Dec. 2, 2009

(65) Prior Publication Data

US 2011/0028301 A1 Feb. 3, 2011

Related U.S. Application Data

(60) Provisional application No. 61/119,059, filed on Dec. 2, 2008, provisional application No. 61/185,354, filed on Jun. 9, 2009.

(51) Int. Cl.
*C04B 35/575* (2006.01)
*C04B 35/626* (2006.01)
*C04B 35/628* (2006.01)
*C04B 35/634* (2006.01)
*C04B 35/64* (2006.01)

(52) U.S. Cl.
CPC ....... *C04B 35/5755* (2013.01); *C04B 35/62655* (2013.01); *C04B 35/62695* (2013.01); *C04B 35/62807* (2013.01); *C04B 35/63476* (2013.01); *C04B 35/64* (2013.01); *C04B 2235/3418* (2013.01); *C04B 2235/383* (2013.01); *C04B 2235/3821* (2013.01); *C04B 2235/422* (2013.01); *C04B 2235/425* (2013.01); *C04B 2235/48* (2013.01); *C04B 2235/5436* (2013.01); *C04B 2235/5445* (2013.01); *C04B 2235/6562* (2013.01); *C04B 2235/6583* (2013.01); *C04B 2235/661* (2013.01); *C04B 2235/723* (2013.01); *C04B 2235/77* (2013.01); *C04B 2235/785* (2013.01); *C04B 2235/786* (2013.01); *C04B 2235/80* (2013.01); *C04B 2235/96* (2013.01)

(58) Field of Classification Search
USPC ....................................................... 264/682
See application file for complete search history.

(56) References Cited

U.S. PATENT DOCUMENTS

| 4,195,066 A | 3/1980 | Schwetz et al. ............... 423/291 |
| 4,429,003 A * | 1/1984 | Fredriksson et al. ....... 428/317.9 |
| 5,372,978 A | 12/1994 | Ezis ................................. 501/90 |
| 6,562,745 B2 * | 5/2003 | Willkens et al. ................ 501/88 |
| 2003/0107146 A1* | 6/2003 | Hosoe et al. ..................... 264/81 |
| 2006/0121239 A1* | 6/2006 | Furukawa et al. ............. 428/116 |
| 2008/0093779 A1* | 4/2008 | Cutler et al. .................. 264/682 |

FOREIGN PATENT DOCUMENTS

EP 0 239 789 10/1987

OTHER PUBLICATIONS

S. Prochazka et al., "Effect of Boron and Carbon on Sintering of SiC", *Journal of American Ceramic Society—Discussions and Notes*, 58(1-2):72 (1975).

(Continued)

*Primary Examiner* — Joseph S Del Sole
*Assistant Examiner* — Russell Kemmerle, III
(74) *Attorney, Agent, or Firm* — Ostrolenk Faber LLP

(57) ABSTRACT

Disclosed is a method for the synthesis of silicon carbide (SiC) bodies having a relative density of 99% or higher and a SiC body synthesized according to the method.

11 Claims, 10 Drawing Sheets

(56) References Cited

OTHER PUBLICATIONS

F.F. Lange, "Hot-pressing behavior of silicon carbide powders with additions of aluminum oxide", *Journal of Materials Science*, 10:314-320 (1975).

M.A. Mulla et al., "Pressureless sintering of β-SiC with $Al_2O_3$ additions", *Journal of Materials Science*, 29:934-938 (1994).

J.H. She et al., "Densification behavior and mechanical properties of pressureless-sintered silicon carbide ceramics with alumina and yttria additions", *Materials Chemistry and Physics*, 59:139-142(1999).

G. Rixecker et al., "High-temperature effects in the fracture mechanical behaviour of silicon carbide liquid-phase sintered with $AlN$-$Y_2O_3$ additives", *Journal of the European Ceramic Society*, 21:1013-1019 (2001).

S.D. Nunn et al., "Improved Ballistic Performance by Using a Polymer Matrix Composite Facing on Boron Carbide Armor Tiles", *Ceram. Eng. and Sci. Proc.*, 26(7):287-292 (2005).

ASTM C1161-02c, "Standard Test Method for Flexural Strength of Advanced Ceramics at Ambient Temperature", *Annual Book of ASTM Standards* (2007).

ASTM C1421-09, "Standard Test Methods for Determination of Fracture Toughness of Advanced Ceramics of Ambient Temperature", *Annual Book of ASTM Standards* (2007).

ASTM C1198-09, "Standard Test Method for Dynamic Young's Modulus, Shear Modulus, and Poisson's Ratio for Advanced Ceramics by Sonic Resonance", *Annual Book of ASTM Standards* (2007).

J. Swab, "Recommendations for Determining the Hardness of Armor Ceramics", *Int. J. Appl. Ceram. Technol.*, 1(3):219-225 (2004).

M. Flinders et al., "High-Toughness Silicon Carbide as Armor", *J. Am. Ceram. Soc.*, 88(8):2217-2226 (2005).

ASTM C1327-08, "Standard Test Method for Vickers Indentation Hardness of Advanced Ceramics", *Annual Book of ASTM Standards* (2007).

ASTM C1326-08, "Standard Test Method for Knoop Indentation Hardness of Advanced Ceramics", *Annual Book of ASTM Standards* (2007).

H. Lee et al., Hardness and Fracture Toughness of Pressureless-Sintered Boron Carbide ($B_4C$), *J. Am. Ceram. Soc.*, 85(5)1291-1293 (2002).

N. Cho et al., "Density- and hardness-optimized pressureless sintered and post-hot isostatic pressed $B_4C$", *J. Mater. Res.*, 20(8):2110-2116 (2005).

V. Skorokhod Jr. et al., "Mechanical properties of pressureless sintered boron carbide containing $TiB_2$ phase", *J. Mat. Sci. Lett.*, 15(15):1337-1339 (1996).

C.H. Lee et al., "Pressureless sintering and related reaction phenomena of $Al_2O_3$-doped $B_4C$", *Journal of Materials Science*, 27:6335-6340 (1992).

Y. Kanno et al., "Additive Effect on Sintering of Boron Carbide", *J. Ceram. Soc. Jpn.*, 95(11):1137-1140 (1987).

Z. Zakhariev et al., "Properties of polycrystalline boron carbide sintered in the presence of $W_2B_5$ without pressing", *J. Mater. Sci. Lett.*, 7(7):695-696 (1988).

F. Thevenot, "Boron Carbide—A Comprehensive Review", *Journal of the European Ceramic Society*, 6:205-225(1990).

K. Nihara et al., "The Effect of Stoichiometry on Mechanical Properties of Boron Carbide", *Communications of the American Society*, 67:C13-C14 (1984).

H. Lee et al., "Pressureless Sintering of Boron Carbide", *J. Am. Ceram. Soc.*, 86(9):1468-1473 (2003).

H.Lee et al., "Sintering of Boron Carbide Heat-Treated with Hydrogen", *J. Am. Ceram. Soc.*, 85(8):2131-2131 (2002).

C.G. Bergeron et al., "Phase Equilibria in Ceramics", *American Ceramic Society*, p. 43, Westerville, OH (1984).

H.O. Pierson, "Silicon Carbide and Boron Carbide", *Handbook of Refractory Carbides and Nitrides*, pp. 142-143, John Wiley & Sons, New York (1996).

\* cited by examiner

SIC BODIES AND PROCESS FOR THE FABRICATION OF SIC BODIES

CLAIM OF PRIORITY

This application is based on and claims the benefit of U.S. Provisional Application Ser. No. 61/119,059, filed on Dec. 2, 2008, entitled PROCESS FOR FABRICATION OF SiC BODIES and U.S. Provisional Application Ser. No. 61/185,354, filed on Jun. 9, 2009, entitled PROCESS FOR FABRICATION OF SiC BODIES. A claim of priority is hereby made to both applications and the contents of both applications are specifically incorporated herein by reference.

BACKGROUND

The ballistic performance of ceramic armor improves as the porosity within the ceramic body decreases to zero. Further, as porosity is often not uniformly distributed, its presence leads to inconsistent and unpredictable ballistic response to high velocity projectiles. Thus, for an armor application, ideally, the entire body of a ceramic body is uniformly pore free, rather than having an overall high relative density which would not preclude sporadic localized porosity.

For a pore-free ceramic body, decreased grain size correlates to increased hardness (and correspondingly improved ballistic stopping power) based on a Hall-Fetch relationship. However, simultaneously achieving small grain size and a low volume percent porosity has proven difficult in many ceramic systems because higher sintering temperatures and/or longer sintering times to reduce porosity will usually foster exaggerated grain growth.

Silicon carbide (SiC) is a well known ceramic used as the strike face in armor systems. A typical armor may be made from a SiC body, which has been fabricated through a solid state sintering of a SiC green body made from SiC particles/powder. Carbon and boron carbide ($B_4C$) are typical additives used to facilitate solid-state sintering of SiC. It is well known that a silica ($SiO_2$) passivation coating is invariably formed on SiC particles during synthesis, communition, and handling. To remove silica, SiC particles are evenly coated with phenolic resin, which can be converted to carbon through a pyrolysis heat-treatment. The carbon then reacts away the silica coatings on the particles through reduction of silica, forming more SiC as a reaction product. Furthermore, boron carbide is known as a sintering aid for SiC, in which it is believed to increase grain boundary diffusivity during sintering heat-treatment. Solid-state pressureless sintering with these additives has been known to yield relative densities in excess of 95%.

Attempts to process solid-state sintered SiC to theoretical density by pressureless sintering to a closed-porosity state, followed by hot isostatically pressing (HIPing) of the part with no encapsulant has proven elusive. HIPing, while increasing the relative density of such sintered specimens, does not bring the specimens to their full theoretical density.

SUMMARY OF THE INVENTION

Described herein is a method for the synthesis of a SiC body having a relative density close to the theoretical density of SiC while maintaining fine and equiaxed grains.

The reason for the failure to achieve relative densities through HIPing is believed by the inventors to be the presence of residual carbon in the form of graphite that facilitates the retention of open channels from the exterior surface of the pressureless sintered SiC body to depths within the body, which allow pressure equilibration that negates the inward hydrostatic compression required to squeeze porosity out of the pressureless sintered SiC body.

A method according to the present invention results in the closing of open porosity in a sintered body free of exaggerated grain growth, whereby post-HIPing is successfully applied to form a nearly pore-free body.

According to one aspect of the present invention, the pressureless sintered SiC body is encapsulated through oxidation of the exterior surface thereof resulting in a silica-containing coating that encapsulates the pressureless sintered SiC body. Surface oxidation of sintered SiC has been shown in the work of others to increase the bending strength of the ceramic and thus by itself, is not unique. However, in a method according to the present invention, the oxidized layer is used as a liquid phase-containing encapsulant for HIPing, which permits the formation of a fine-grained microstructure having a relative density above 99%, which could not be obtained without the oxidation step for the same SiC powder subjected to the same processing steps.

It is noteworthy that, contrary to conventional thinking, a method according to the present invention does not call for maximum densification by pressureless sintering prior to HIPing. Rather, according to one aspect of the present invention, SiC is pressureless sintered to a minimum relative density (96%) required for HIPing to take effect (after oxidation heat-treatment). As a result, a SiC body having a microstructure with superior properties is attained.

In a comparative study disclosed below, a sintered SiC body synthesized according to the present invention showed a remarkably high hardness (as high or higher than a well known boron carbide armor material), and with a narrow spread in hardness, which was attributed to a fine-grained, fully dense microstructure, with a fine, well-dispersed graphite second phase.

While SiC of high relative density (above 99%) can be produced through hot pressing, hot pressing can only produce geometrically-limited bodies as it requires pressing SiC powder in a geometrically shaped (e.g. flat plate) mold cavity. A method according to the present invention employs pressureless sintering and HIPing, which advantageously allow for the fabrication of non-geometric and organic shapes (shapes that do not follow a geometric shape) such as personal armor parts that have been shaped to follow a complex surface of a part of a human body (e.g. torso, arm, head, thigh etc.). Advantageously, therefore, a process according to the present invention allows for the fabrication of SiC bodies having complex, non-geometric shapes of high relative density (99%).

Other features and advantages of the present invention will become apparent from the following description of the invention which refers to the accompanying drawings.

BRIEF DESCRIPTION OF THE FIGURES

(FIGS. 4C-4E).

DETAILED DESCRIPTION OF EMBODIMENTS OF THE INVENTION

Figure 1:
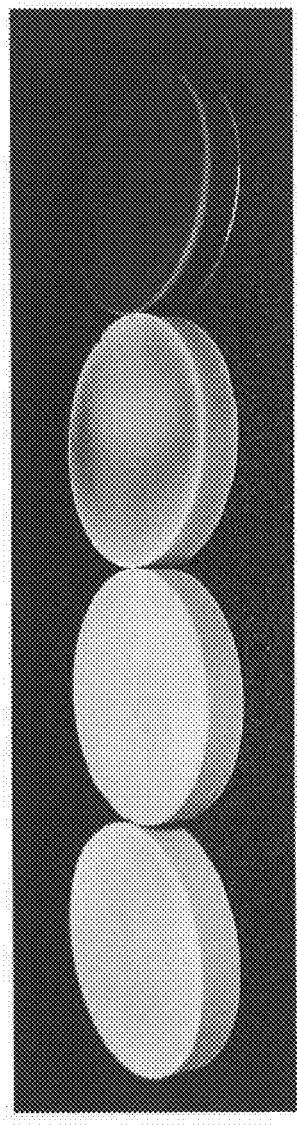
FIG. 1 shows a number of pressureless sintered SiC bodies, the exterior surfaces of which have been oxidized according to the present invention. The samples are arranged by sintering soak temperature from lowest on left to highest on right. Lower fired relative density resulted in a thicker silica coating.

A method for the synthesis of a silicon carbide (SiC) body according to the present invention includes encapsulating a pressureless sintered SiC body (which may have channels of open porosity leading from the exterior surface thereof to interior regions) and then hot isostatically pressing (HIPing) the encapsulated pressureless sintered SiC body to obtain a sintered SiC body having a relative density of at least 99%.

A process according to preferred embodiment includes forming a green body from SiC particles that are coated with silicon dioxide ($SiO_2$) and a reducing agent (and optionally a sintering aid, e.g. $B_4C$), reducing/deoxidizing the silicon dioxide, pressureless sintering the reduced/deoxidized green body to obtain a pressureless sintered body, encapsulating the pressureless sintered body to obtain an encapsulated body, and hot isostatically pressing the encapsulated body to obtain a sintered SiC body having a relative density above 99%. The reducing agent is provided in order to remove silicon dioxide from the SiC particles. In one embodiment, the reducing agent is carbon which is added to reduce/deoxidize the outer silicon dioxide coating of the SiC particles and form silicon carbide with the silicon that is left after reduction: SiC by: $SiO_2 + 3C = SiC + 2CO$. It is also conceivable that carbon monoxide or hydrogen gas could accomplish reduction and remove the silicon as SiO gas, which may be acceptable. To introduce carbon as an intimately-mixed reducing agent, phenolic resin may be mixed with SiC carbide particles. Thus, an appropriate amount of phenolic resin may be mixed with an appropriate amount of SiC particles and formed into a green body using any desired method. For example, an aqueous suspension of SiC particles, boron carbide ($B_4C$) particles, dissolved phenolic resin, and binder can be spray dried to obtain free-flowing granules. The granules are then uniaxially pressed and then cold isostatically pressed to obtain a green body. Thereafter, the green body is subjected to a thermolysis and pyrolysis heat treatment to extract binder polymers and to convert the phenolic resin to a carbon char to obtain a pressurless sintered body. The pressureless sintered SiC body is preferably sintered to have a relative density of at least 96%. According to one aspect of the present invention, pressureless sintering is carried out at a sintering soak temperature above 2000° C. but below 2100° C. According to another aspect of the present invention, the pressureless sintered body is encapsulated with an encapsulant to obtain an encapsulated sintered body. For example, according to the preferred embodiment of the present invention, the pressureless sintered body is encapsulated by a silicon dioxide-containing encapsulant formed by thermally oxidizing the exterior surfaces of the pressureless sintered silicon carbide body. The thermal oxidation step may be carried out in a furnace that is filled with air. Thereafter, the encapsulated pressureless sintered SiC body is hot isostatically pressed to obtain a sintered silicon carbide body having a relative density of 99% or more.

A process according to the present invention allows for the synthesis of a SiC body with a relative density of 99% or higher (i.e. low porosity) that includes fine grains of SiC and fine uniformly-distributed grains of graphite. A SiC body that is synthesized according to the present invention advantageously exhibits substantially uniform hardness characteristics, which is highly desirable for armor and wear applications.

Specifically, a sintered SiC body according to the present invention consists essentially of SiC and graphite exhibiting hardness values from different locations on a polished cross-section thereof that vary no more than 2% from an average hardness value on a conventional hardness scale such as the Vickers scale or the Knoop scale. Thus, on the Vickers scale the hardness values do not vary more than ±1.7% from an average hardness value, and on the Knoop scale the hardness values do not vary more than ±1.2% from an average hardness value. The grain sizes of the SiC range from less than 1 micrometer to about 6 micrometer with a median size of about 2 micrometers, while the average grain size of the graphite is 0.219 or about 0.22 micrometers.

First Comparative Data Set

The following compares sintered SiC bodies synthesized according to the present invention to sintered SiC bodies that were synthesized without the encapsulation step indicating that the encapsulation step makes a significant contribution to the densification and the hardness of the sintered SiC.

An aqueous suspension of alpha-SiC ($d_{50}$=0.7 μm) and 0.36 wt % boron carbide ($d_{50}$=0.8 μm), with dissolved phenolic resin (added in an amount to leave a 2.5 wt % carbon char) and PVA/PEG (binder/plasticizer, 1.0 and 0.5 wt %, respectively) were spray-dried into free-flowing spherical granules. Note that the alpha-SiC powder included SiC particles coated with silicon dioxide. The spherical granules were then uniaxially pressed under 13.7 MPa into 0.75 inch diameter disk-shaped powder compacts, and then cold isostatically pressed (CIPed) in evacuated latex bags at 344 MPa to obtain a plurality of green bodies. The green bodies were then subject to pyrolysis and thermolysis in order to thermally extract the binder and convert the phenolic resin to a carbon char. Specifically, the green bodies were heated at 3° C./minute to 1000° C. for 4 hours in flowing Argon resulting in the pyrolysis of the phenolic resin and the thermolysis of the binder. These bodies were then pressureless sintered in a laboratory-scale graphite furnace in an inert atmosphere, heating each at 50° C./minutes and each to a respective soak temperature of 2000, 2050, 2100, 2150, or 2200° C., and held at the soak temperature for one hour in order to obtain a plurality of pressureless sintered SiC bodies. The pressureless sintered SiC bodies were then cooled at the natural rate of cooling of the furnace after the heating elements were turned off.

Figure 2A:
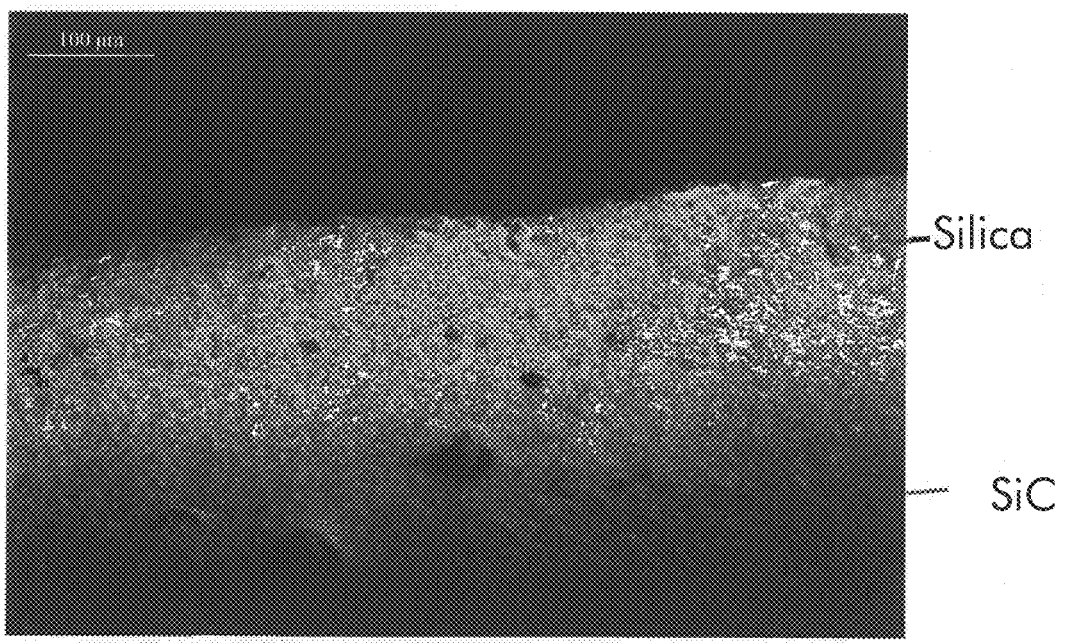
FIG. 2A shows a cross-section of a pressureless sintered SiC specimen showing a ~150 µm thick oxidized region (silica) over an unoxidized SiC interior.
Figure 2B:
FIG. 2B shows a magnified view of the oxidized layer.

After pressureless sintering, the pressureless sintered SiC bodies were oxidized in a $MoSi_2$ heating-element furnace open to the atmosphere (i.e. oxidized in air) at 1400° C. for 60 minutes. The effect of oxidation was more visually apparent on the surfaces of the bodies having lower relative density, as seen in FIG. 1. Without being bound by theory, it is believed that the greater open porosity of the lower relative density bodies facilitated more extensive oxidation. The oxidation step resulted in pressureless sintered SiC bodies encapsulated by an encapsulant that includes silicon dioxide and SiC. It is well known that a passivating layer against oxidation forms in SiC, permitting its use, for example, as electrical heating elements in oxidizing atmospheres. As implied in FIG. 2A, this ~150 μm-thick layer is interpreted to consist of silica-coated SiC particles. Otherwise, all microstructural features would be absent if the region was fully converted to $SiO_2$. The liquid (or liquid portion of the) silica-coated SiC near-surface layer serves as a barrier to oxygen diffusion.

Figures 3A, 3B:
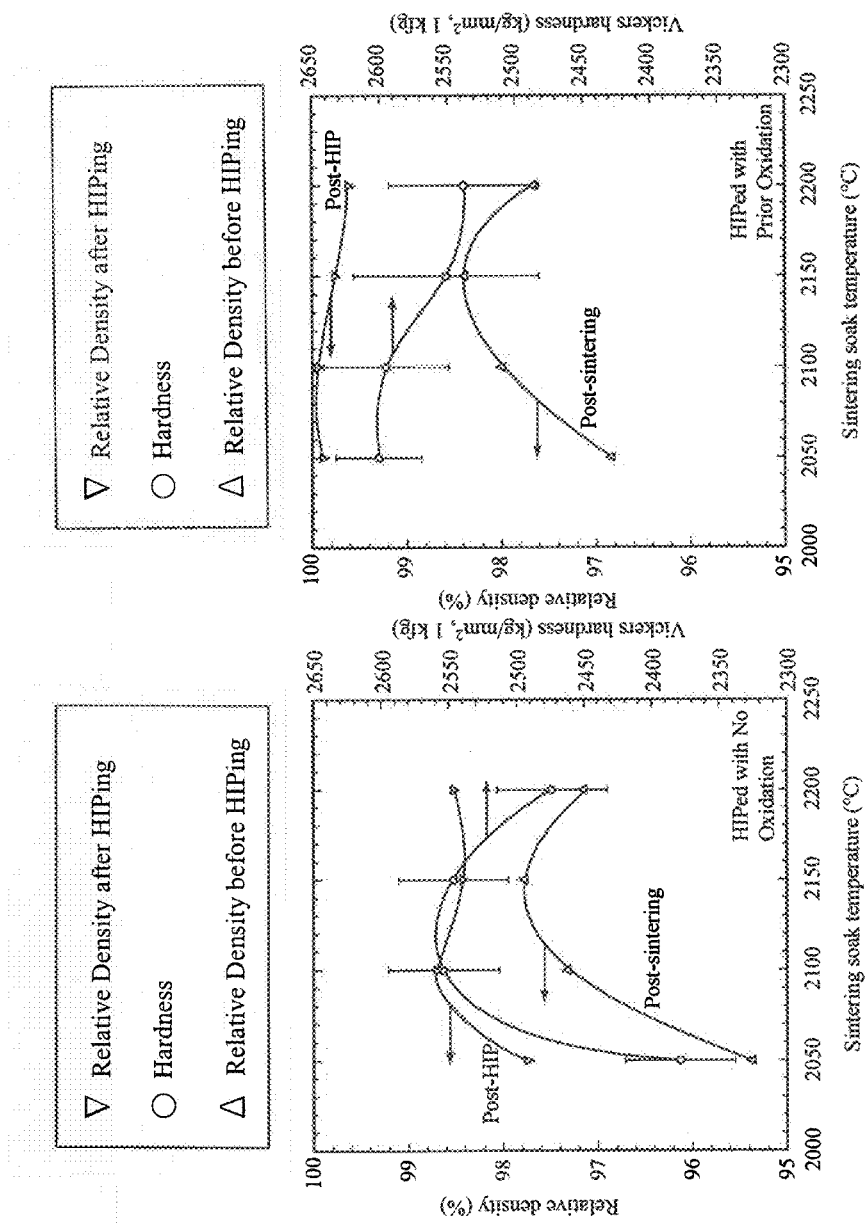
FIGS. 3A and 3B show hardness and relative density values before and after HIPing for specimens which were not oxidized prior to HIPing (FIG. 3A), and samples which were oxidized before HIPing (FIG. 3B). In this and all other figures displaying hardness data, error bars indicate +/− standard deviations.
Figure 4A:
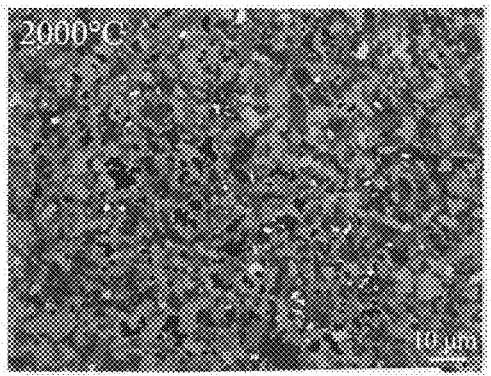
FIGS. 4A-4E show thermally etched microstructures of oxidized and HIPed pressureless sintered SiC bodies which were sintered at the indicated soak temperatures. Abnormal gain growth is evident in samples soaked at and above 2100° C.
Figure 4B:
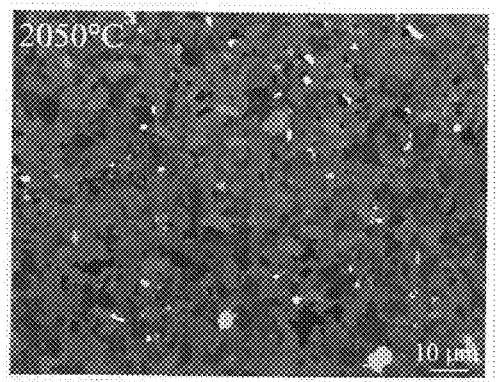
Figure 4C:
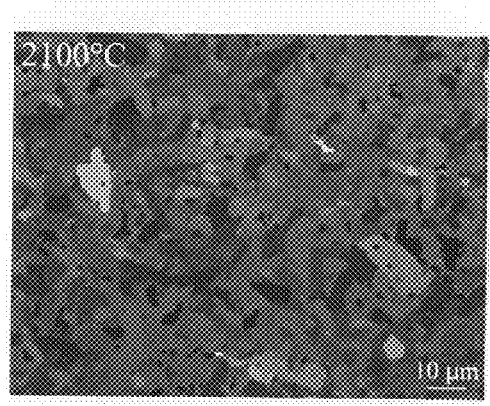
Figure 4D:
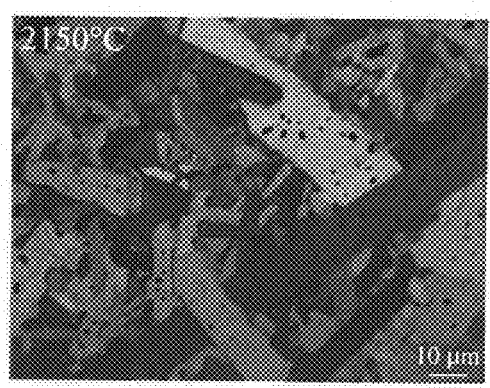
Figure 4E:
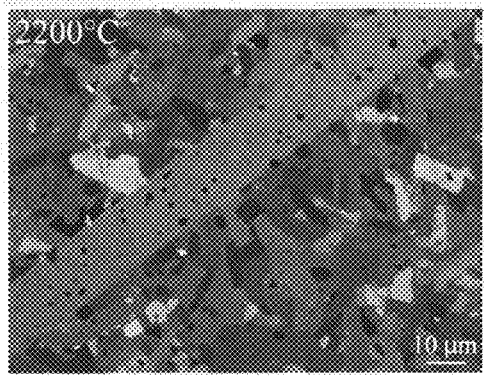
Figure 5A:
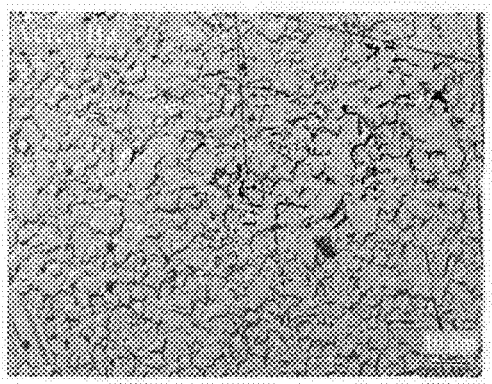
FIGS. 5A-5E show optical micrographs of polished and thermally etched surfaces of a sample of a SiC body synthesized according to the present invention (FIG. 5C) and a number of other armor grade ceramic bodies.
Figure 5B:
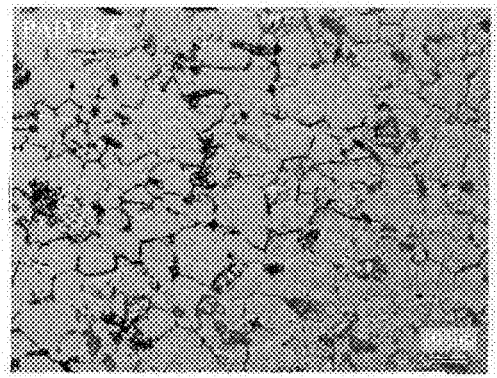
Figure 5C:
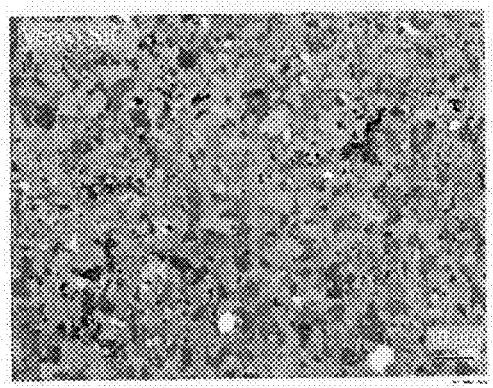
Figure 5D:
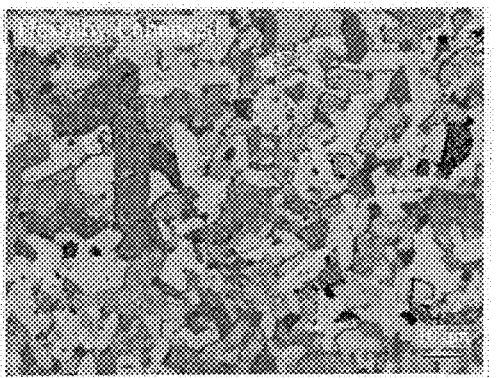
Figure 5E:
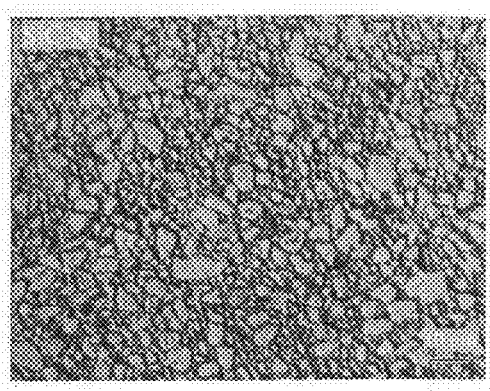

After oxidation, all pressureless sintered and encapsulated SiC bodies were HIPed at 1900° C. and 206.8 MPa Ar for 2 hours. The surfaces of the HIPed bodies were then ground to remove the silica-containing coatings/encapsulant, and Archimedes densities were measured. The bodies were then polished with diamond polishing media (1 μm final size) and tested for hardness (following ASTM standard C1327-99). The data for these tests are given in Table 1 and FIG. 3B. It can be seen that all bodies which were pressureless sintered to above 96% relative density reached relative densities at or above 99.6% after oxidation and post-HIPing. Note further that hardness values in Table 1 for samples soaked at 2000° C. to 2200° C. show a standard deviation ranging from about 1.2% (2000° C.) to about 2.2% (2200° C.), with samples having the highest relative density (2050° C. to 2150° C. soak temperature) showing a standard deviation below 2% indicating a high level of consistency in the microstructure thereof. There was an inverse relationship between sintering soak temperature (at and above 2100° C.) and measured hardness after HIPing. Specifically, hardness values decreased with increasing soak temperatures above 2100° C. (See FIG. 3B). Microstructures from polished sections of the HIPed bodies were subsequently thermally etched at 1500° C. for 30 minutes in an inert atmosphere. As shown in FIG. 4A-4E, the etched microstructures reveal that abnormal grain growth became prominent at sintering soak temperatures at and above 2100° C., and porosity is observed trapped within the large grains. It appears that at soak temperatures above 2100° C., abnormal grain growth and associated trapped porosity results in lower hardness values after HIPing.

To prove that an oxidation step improved the HIPing of SiC, another set of SiC green bodies from the same SiC powder were sintered and HIPed under the same conditions as before, but without an oxidation step. The data for these specimens is given in Table 2 and plotted in FIG. 3A. For soak temperatures at and above 2050° C., relative densities were on average 1.45% lower than specimens which were exposed to an oxidation step before HIPing. Without being bound by theory, it is believed that the silica coatings on SiC particles near the part surface acted as an effective liquid encapsulant during HIPing, which flowed and sealed off open porosity channels that otherwise would have permitted high pressure gas infiltration into the interior of the pressureless sintered SiC bodies resulting in pressure equalization.

The hardness value of the specimen pressureless sintered at 2050° C., oxidized and HIPed, is superior to all other samples. The data suggests that sintering soak temperatures below 2100° C. and above 2000° C. led to finer, equiaxed grains after sintering, which when oxidized and HIPed to near-theoretical density, exhibited optimal hardness. Furthermore, the spread in hardness values (see Table 1) of this specimen was the lowest of all evaluated specimens, a further testament to the consistency of its microstructure.

TABLE 1

Relative Density and Hardness (Vickers) of Specimens which were Oxidized Prior to HIPing

| Sintering Soak Temperature (° C.) | Relative Density After Sintering (%) | Relative Density after Oxidation and HIPing (%) | Hardness after HIPing (kg/mm$^2$) |
|---|---|---|---|
| 2000 | 93.29 | 95.76 | 2036.30 +/− 174.65 |
| 2050 | 96.85 | 99.87 | 2600.70 +/− 31.90 |
| 2100 | 98.01 | 99.93 | 2595.20 +/− 46.33 |
| 2150 | 98.40 | 99.75 | 2550.70 +/− 68.37 |
| 2200 | 97.67 | 99.60 | 2537.50 +/− 55.45 |

TABLE 2

Relative Densities and Hardnesses (Vickers) of Specimens which were Not Oxidized Prior to HIPing

| Sintering Soak Temperature (° C.) | Relative Density after Sintering (%) | Relative Density after HIPing (%) | Hardness after HIPing (kg/mm$^2$) |
|---|---|---|---|
| 2050 | 95.38 | 97.73 | 2378.90 +/− 152.43 |
| 2100 | 97.33 | 98.69 | 2553.80 +/− 79.41 |
| 2150 | 97.79 | 98.41 | 2546.50 +/− 65.81 |
| 2200 | 97.16 | 98.51 | 2473.50 +/− 139.16 |

Second Comparative Data Set

While the last experimental data show that the encapsulation step improves the relative density and hardness of pressureless sintered SiC bodies after HIPing, the following experimental data show that a SiC body synthesized according to the present invention exhibits superior properties compared to other known armor grade materials including known SiC armor grade materials.

In this comparative study, five commercially-manufactured ceramic armor compositions were compared to a pressureless sintered, encapsulated and HIPed SiC body (a 4 inch×4 inch body of about 0.3-0.4 inches thickness) synthesized according to the present invention (referred to as Verco SiC in the study) at 2050° C. soak temperature, which was the optimal temperature observed in the previous study. The commercial compositions included Verco (Verco Materials, LLC, Atlanta, Ga.) $B_4C$ (densified through pressureless sintering and HIPing), Hexyloy Enhanced SiC (Saint-Gobain Ceramics, Niagara Falls, N.Y.) (densified through pressureless sintering), PAD-$B_4C$ (pressure-assisted densification/hot pressing) and SiC—N (both from BAE Systems, Vista, Calif.)

(densified through hot-pressing). All but Verco SiC were provided by the Army Research Laboratory (ARL, Aberdeen, Md.). Verco $B_4C$ showed the highest hardness, was phase pure, fully dense, and of finer grain size as compared to PAD-$B_4C$ (hot-pressed). Verco SiC showed a hardness equal to or higher than PAD-$B_4C$, and a comparatively narrow distribution in measured hardnesses, which was attributed to a fine-grained, fully-dense, solid state sintered microstructure with a fine and well-distributed graphite second phase.

Specimen densities were determined using the Archimedes method. Three measurements were taken for dry, suspended, and saturated weights, respectively. Samples were boiled in water for 1 hour and cooled prior to measuring suspended and saturated weights at room temperature. Phases were identified through x-ray diffraction (X'Pert PRO Alpha-1 diffractometer, PANalytical, Almelo, The Netherlands). Each sample was scanned fifteen times over a 12 hour period. The scans were merged into a single intensity graph to obtain high peak to noise ratio patterns. The $B_4C$ specimens were placed in an etching solution consisting of 1 g of KOH in 100 mL of deionized water. A thin leaf of Pt was used as the cathode. Using 21 VDC and 0.3 A, the specimens were etched for a period of 30-60 seconds to make the grain boundaries evident. Polished SiC specimens were thermally etched at 1500° C. for 30 min in a flowing Ar atmosphere. The etched microstructures were characterized using an optical microscope (Olympus BX440, Olympus Corporation, Tokyo, Japan) and a scanning electron microscope (SEM, Model 1530, LEO Electron Microscopy, Inc., Oberkochen, Germany). Energy-dispersive X-ray spectroscopy (EDS, Oxford Pentafet detector with ultrathin window, Oxford Instruments, Oxfordshire, UK) was used to characterize the elements present in each specimen. Average grain sizes and grain size distributions were calculated using the line-intercept method (500-700 measurements per micrograph) on optical micrographs of etched polished surfaces.

Four-point flexural strength measurements were performed on test bars. Twelve rectangular test specimens of 3 mm×4 mm×45 mm were evaluated. The specimens were machined (Ferro-Ceramic Grinding, Inc., Wakefield, Mass.) longitudinally to and finished with a 400 grit resin bonded diamond wheel. Equal amounts of stock were removed from all machined surfaces, with removal rates per the ASTM standard C1161-02c. The load frame (Phoenix load frame, Measurements Technology, Inc., Roswell, Ga.) was equipped with a 450 kg load cell. A fully articulating four-point test fixture (Wyoming Test Fixtures, Inc., Salt Lake City, Utah) was used (2 cm inner span and 4 cm outer span, 5 mm diameter rollers) which followed the specifications of the ASTM C1161-02c standard. For the fixture span and sample size used, the loading rate was set to 0.5 nun/min.

Displacement of each specimen was measured at the crosshead with a precision of 2.54 µm. The breaking force P was measured, from which the flexural strength S was determined from the following relationship:

$$S = \frac{3PL}{4bd^2}$$

where L is the outer support span of the fixture, b is the specimen width, and d is the specimen thickness.

For fracture toughness measurements, bars of dimensions 3 mm×4 mm×45 mm were machined, after which chevron notches were machined into them, in conformance with the Configuration B size specification in the ASTM C1421-01b standard. Twenty chevron-notched specimens were machined (Ferro Ceramic Grinding, Inc., Wakefield, Mass.) for each of the compositions. The test apparatus and fixture were the same as those used in the flexural strength tests. The loading rate was 0.3 mm/minute. The fracture toughness $K_{IC}$ (MPa√m) was calculated from $$K_{IC} = Y_{min}^* \frac{P_{max}(S_o - S_i)}{BW^{3/2}}$$

where $P_{max}$ is the ultimate fracture load for stable crack growth failure, $S_o$ and $S_i$ are the outer and inner spans of the fixture, respectively, B is the sample height, and W is the sample width. $Y_{min}^*$ is the minimum stress intensity factor and relates to the geometry of the chevron-notched cross section. For the Configuration B chevron-notch cross section profile, the calculated value for $Y_{min}^*$ is 4.0984.

The elastic moduli E of the materials were measured using a sonic resonance method, as specified in the ASTM C1198-01 standard. The specimens were analyzed in a Dynamic Elastic Properties Analyzer (Matrix Enterprises, Waterville, Ohio). In this test setup, mechanical excitation was applied to the sample through a transducer on one end, and a second transducer on the other end sensed the fundamental vibration frequency $f_f^2$ (Hz) of the material. This value was used to determine E (GPa) by:

$$E = 0.9465 \frac{mf_f^2 L^3 T_1}{bt^3}$$

where m, b, L, t are the mass (g), width (mm), length (mm), and thickness (mm) of the bar, respectively. $T_1$ is a correction factor to account for Poisson's ratio and other mechanical parameters. Poisson's ratio values for $B_4C$ and SiC were taken from reported values in literature.

Sample pieces of each composition were mounted in epoxy resin and polished to a 1 µm finish using a Struers Rotopol and Pedemat automatic polishing system (Struers, Inc., Westlake, Ohio). Both Knoop and Vickers hardness measurements were taken (Duramin hardness tester, Struers, Westlake, Ohio). The two scales are incomparable due to differences in how the stresses imparted by the indentations are calculated. The instrument calibration was confirmed using the WC-based NIST standard reference material (2831, National Institute for Standards and Technology, Gaithersburg, Md.) for Vickers and Knoop hardness of ceramics and hard metals. Vickers indentations were made as prescribed in the ASTM C1327-99 standard. The applied load of the indent was 9.81 N (1 kgf) for a period of 15 seconds. The indent locations were selected in a blind and unbiased manner. Ten acceptable indentations, as defined in the standard, were measured and recorded. Knoop indentations were taken according the ASTM C1326-03 standard. A 19.6 N (2 kgf) load was applied for 15 seconds. Again, ten acceptable indentations were recorded. For all data relating to mechanical property reported herein, error bars represent one standard deviation above and below the mean.

Results

XRD of Verco $B_4C$ shows $B_4C$ and a trace amount of free graphite. PAD-$B_4C$ scans revealed trace free graphite, as well as trace amounts of alumina. SiC—N was composed of alpha-SiC. XRD results showed that Hexyloy Enhanced SiC and Verco SiC were composed of various polytypes of alpha-SiC along with trace amounts of graphite.

Figure 6:
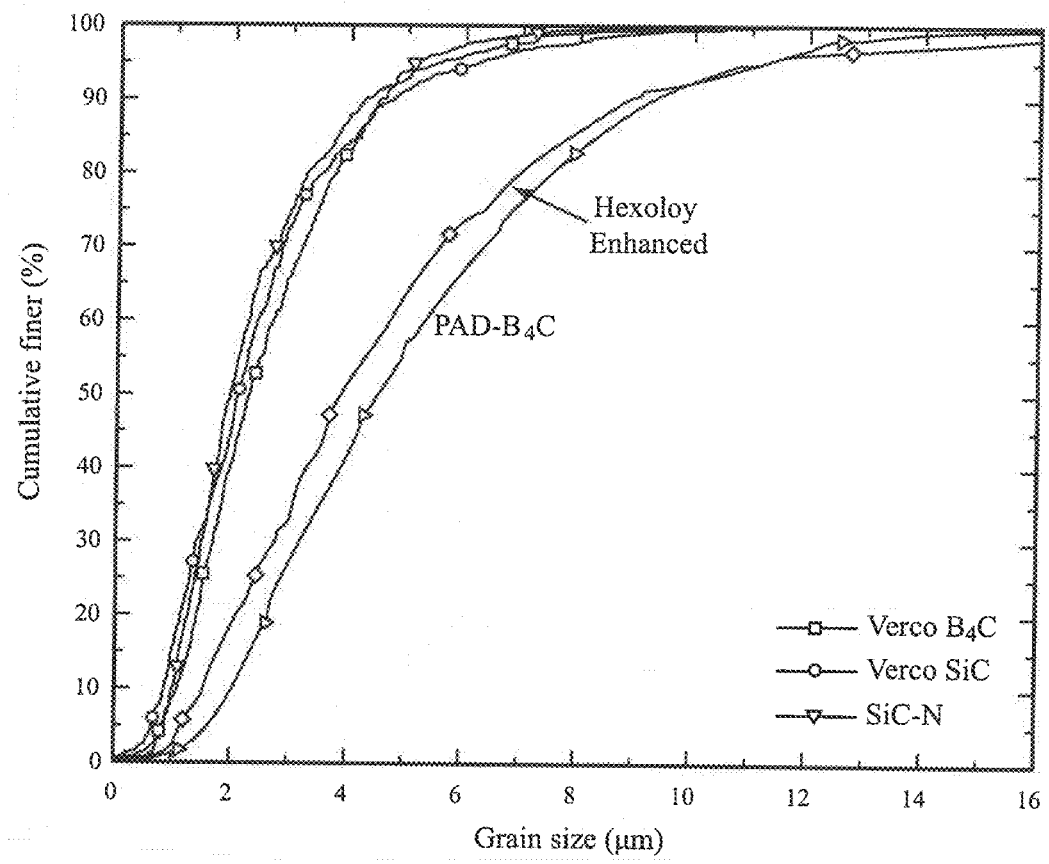
FIG. 6 graphically shows grain size distributions of the ceramic bodies of FIGS. 5A-5E.
Figure 7:
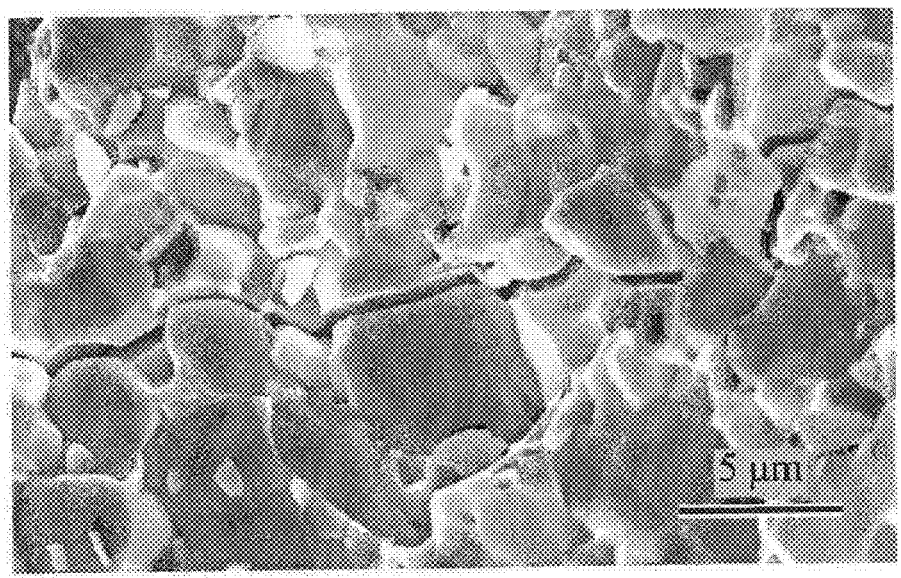
FIG. 7 shows a crack illustrating a mixed-mode fracture in SiC—N, a well known armor grade ceramic.
Figure 8A:
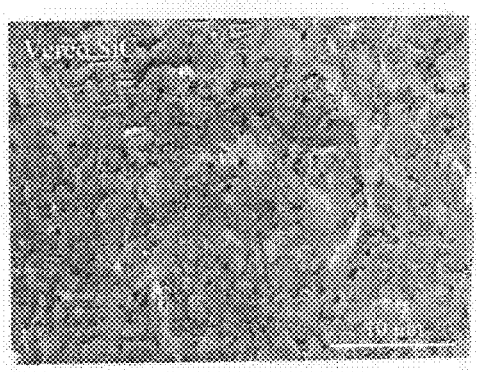
FIG. 8A shows the fracture surface of SiC synthesized according to the present invention and FIG. 8B shows the fracture surface of another known armor grade SiC body (Hexyloy Enhanced SiC, see below).
Figure 8B:
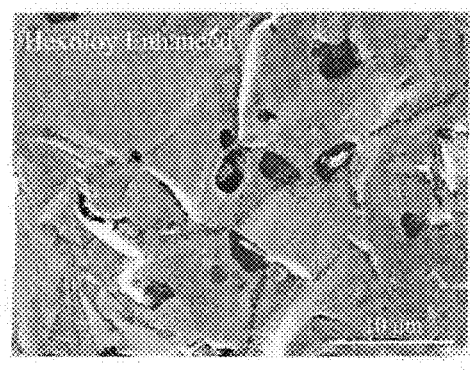
Figure 9:
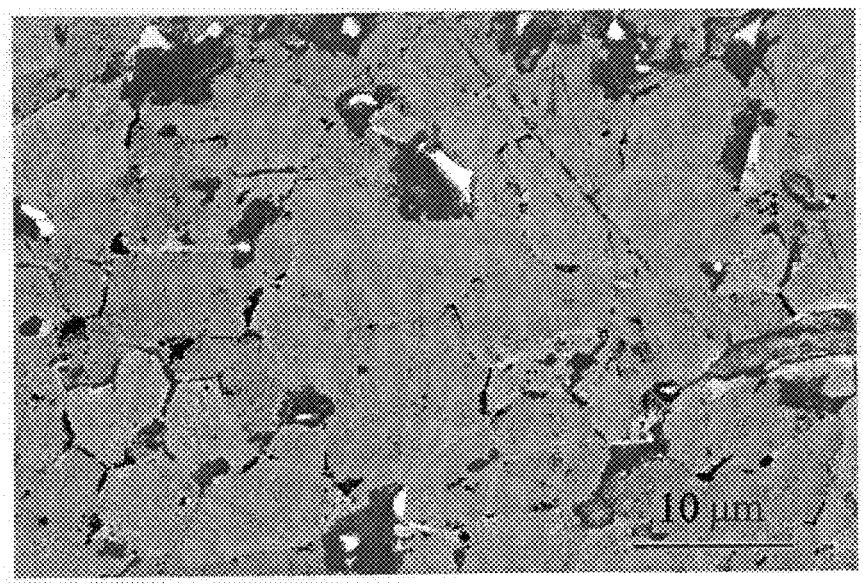
FIG. 9 shows an SEM micrograph of a polished section of a well known boron carbide armor grade body (PAD-$B_4C$).

As shown in FIGS. 5A-5E, SiC—N (FIG. 5E) showed SiC grains mutually separated by a continuous grain boundary phase. The Hexyloy Enhanced SiC (FIG. 5D) specimen displayed grain anisotropy. As shown in FIG. 6, the microstructures of three of the compositions sustained approximately the same median grain size $d_{50}$=2.1 µm and size distribution, while Hexyloy Enhanced SiC ($d_{50}$=3.9 µm) and PAD-$B_4C$ ($d_{50}$=4.5 µm) were coarser-grained. Transgranular fracture is observed in SEM fracture surface images of all specimens except for the SiC—N samples which displayed mixed mode (i.e. 50:50 intergranular and transgranular) fracture (FIG. 7). EDS scans of the SiC—N samples detected aluminum and oxygen at the grain boundaries. For the two sintered SiC specimens shown in FIG. 8A and FIG. 8B, EDS analysis implies that the darker isolated regions in the micrographs are graphite. These regions are smaller and more evenly distributed in the Verco SiC. Quantitative microstructural analysis (line-intercept method) showed the average graphite grain sizes were 1.70 and 0.22 µm for Hexyloy Enhanced and Verco SiC microstructures, respectively. The PAD-$B_4C$ specimen (FIG. 9) exhibited grain boundaries with no apparent interphase, and pockets of graphite (dark phase) with embedded grains of $Al_2O_3$ (white phase), based on interpretations of EDS analysis.

Figure 10:
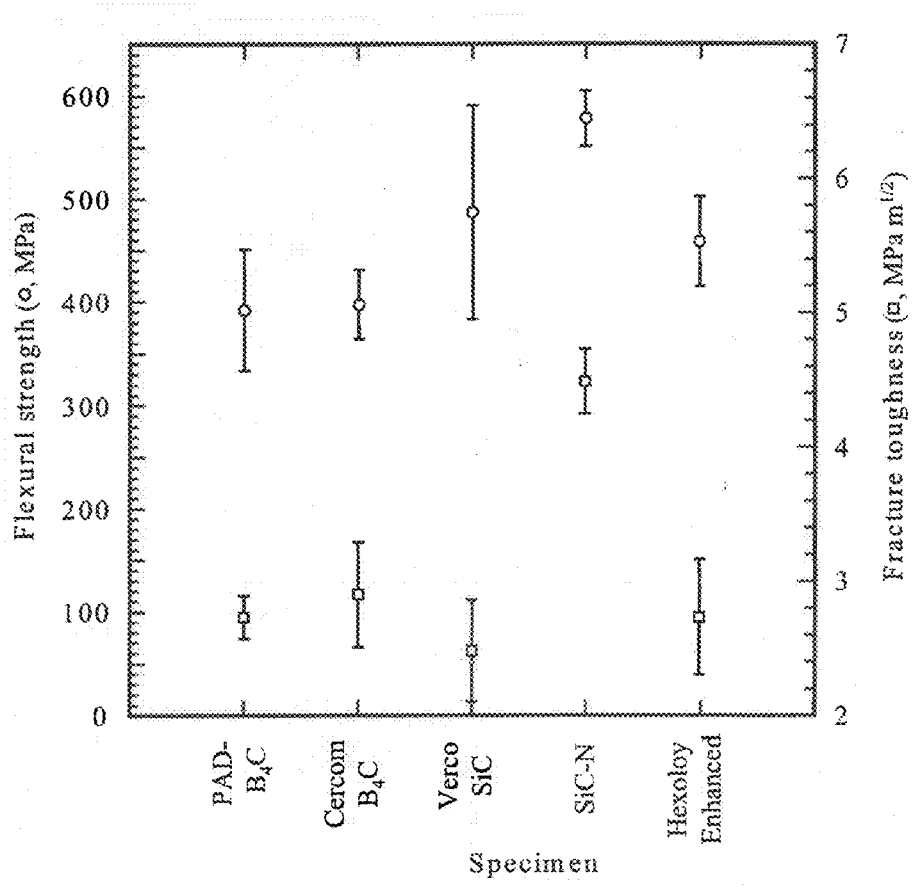
FIG. 10 graphically shows flexural strength and notched-beam fracture toughness values for a SiC body according to the present invention and other well-known armor grade materials.
Figure 11:
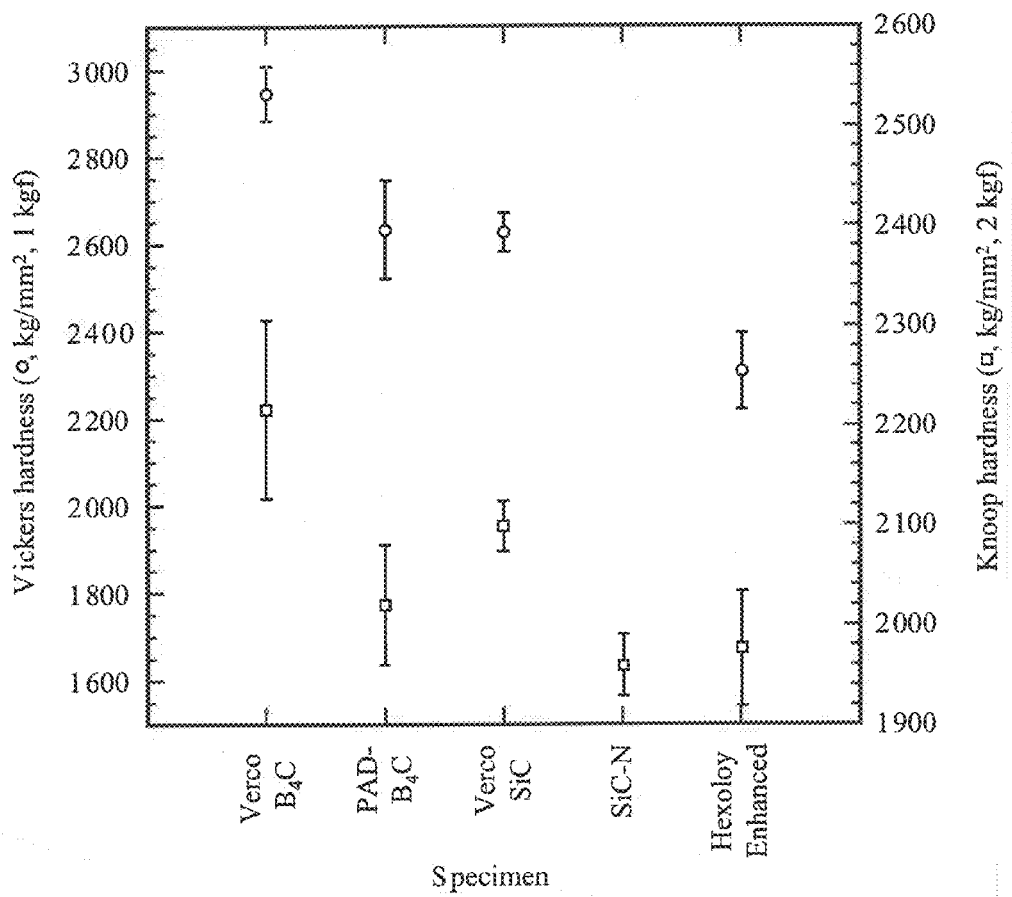
FIG. 11 graphically shows Vickers and Knoop hardness values for a SiC body according to the present invention and other well-known armor grade materials.
Figure 12:
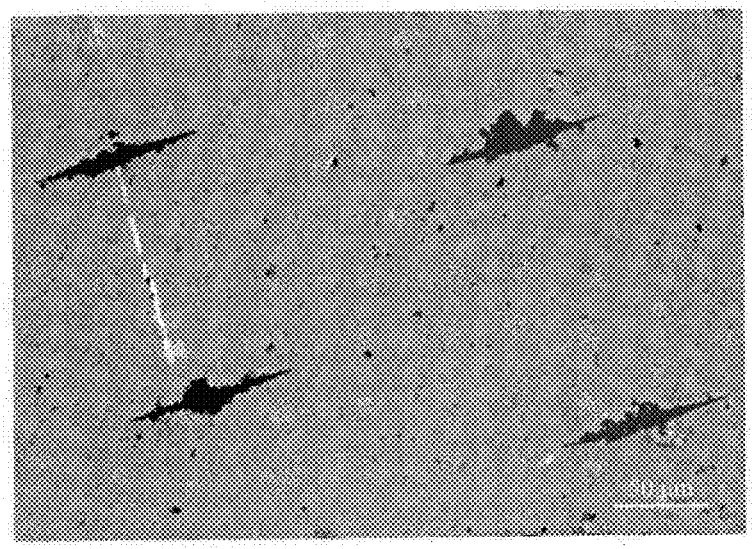
FIG. 12 shows Knoop indentations on SiC—N (a well known armor grade ceramic) exhibiting erratic central cracking but clear, defined diagonal edges.
Figure 13A:
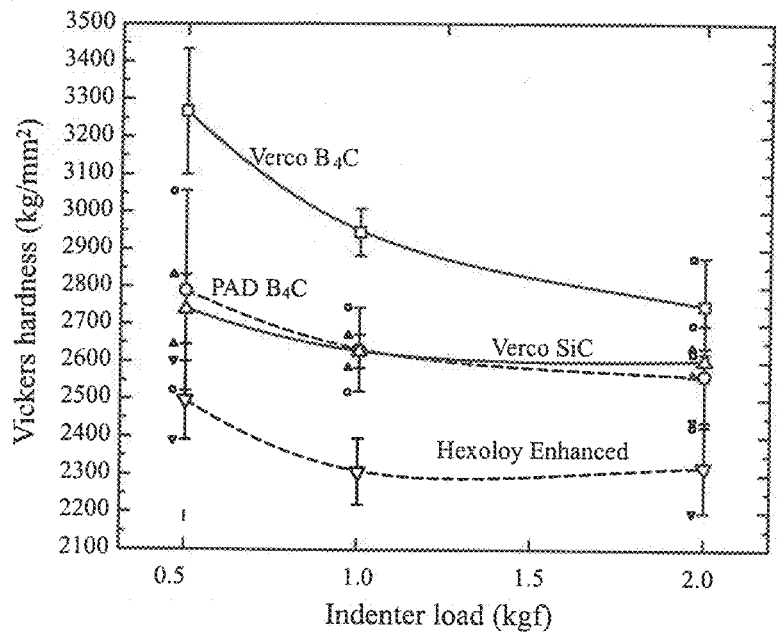
FIGS. 13A and 13B show Vickers (FIG. 13A) and Knoop (FIG. 13B) indentations ranging from 0.5-2 kgf for a SiC body according to the present invention and other well known armor grade ceramic bodies. Ten acceptable indentations were recorded for each loading.
Figure 13B:
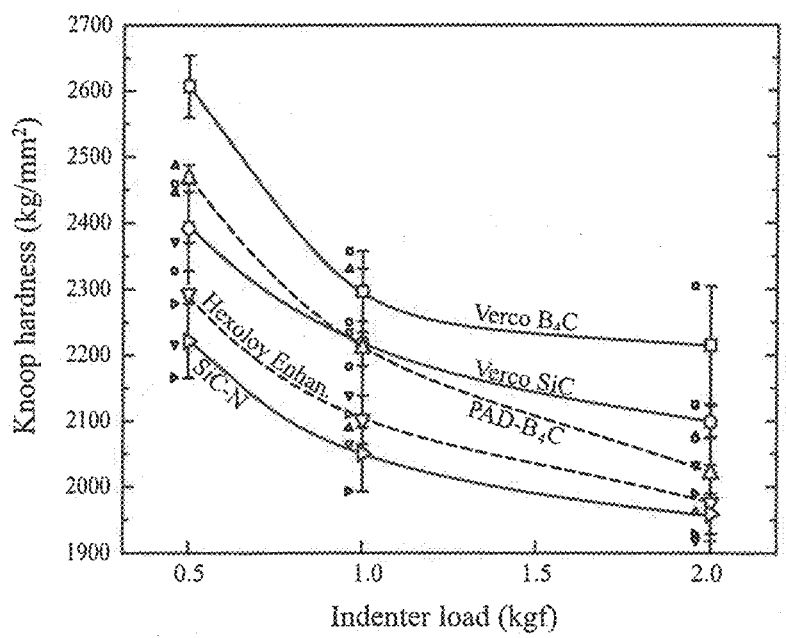

Table 3 summarizes all mechanical testing results. SiC—N showed the highest strength. The sintered SiC specimens were stronger than the $B_4C$ specimens (FIG. 10). The Verco SiC specimen showed a comparatively wide distribution in strength. The SiC—N specimen showed roughly 50% higher fracture toughness values than the other compositions. As shown in FIG. 11, Verco $B_4C$ had the highest indentation hardness (both Knoop and Vickers). Verco SiC exhibited the highest hardness values of all SiC samples tested, with mean values approximately equal to (Vickers) or exceeding (Knoop) those of PAD-$B_4C$, and a narrow spread in values (+/−1.7% in Vickers scale and +/−1.2% in Knoop scale). Vickers hardness of SiC—N could not be measured due to erratic indentation patterns, from which diagonal dimensions could not be determined. As shown in FIG. 13B, Knoop indentation values were measurable for SiC—N samples, since the diagonal tips were discernable. Vickers and Knoop indentations were performed on each ceramic at 4.9 N (0.5 kgf), 9.8 N (1 kgf), and 19.6 N (2 kgf) loadings (FIGS. 13A and 13B). The highest force which could be applied with the available equipment was 2 kgf. All samples exhibited a downward trend in hardness with increasing applied load.

The fracture toughness of the SiC—N materials was approximately 50% greater than the solid-state sintered ceramics (FIG. 10). As reported in other work, a comparatively weak aluminosilicate interphase is the preferential path for crack propagation, creating a tortuous path for cracks and facilitating crack branching. The (4-point bending) fracture strength of a brittle ceramic is highly dependent on the size of the largest flaw on the surface under tension. The high strength and narrow strength distribution of SiC—N is an indicator of the decreasing importance of critical flaw size on strength, due to the crack branching and blunting mechanisms in these specimens. The Verco SiC specimens showed a broad distribution in flexural strengths, which may indicate that the strength of this material would be sensitive to surface finish.

Hardness results are not sensitive to surface flaws since these flaws are diminished through the polishing process, hardness is a very localized test, and the specimen surface is under compression-induced shear rather than tension. Verco $B_4C$ was by far the hardest. The presence of alumina embedded in graphite, a small amount of porosity, and the larger grain sizes of the PAD-$B_4C$ are likely contributors to the comparatively lower hardness. Hardness generally shows a Hall-Petch relationship with grain size; the increase in hardness with decreasing grain size for boron carbide has been demonstrated elsewhere.

The hardness of Verco SiC was remarkably high; as high as PAD-$B_4C$. In comparing Verco SiC and Hexyloy Enhanced SiC, the lower porosity and smaller average grain size of the Verco material are consistent with higher measured hardnesses. The distribution in hardness of the Verco SiC is also very narrow. The graphite particles are more evenly distributed and of finer dimension in the Verco SiC as compared to Hexyloy Enhanced SiC; a hardness indenter would be more likely to measure the same behavior from one location to the next. The low Knoop hardness of the SiC—N specimens is attributable to the weak aluminosilicate interphase at the SiC grain boundaries. Cracks meander and branch in all directions along the interphase under the load of the indenter.

Reported hardness values vary considerably in the literature; more useful comparisons stem from measurements on the same instrument, made by the same operator. Measured hardness decreasing with increasing indenter load in FIG. 13 is a result of a greater fraction of the energy imparted to the specimen going to crack formation and propagation, rather

| Specimen | Density g/cm$^3$ | Flexural Strength MPa | Fracture Toughness MPa$\sqrt{m}$ | Vickers Hardness (HV1) kg/mm$^2$ | Knoop Hardness (HK2) kg/mm$^2$ | Elastic Modules GPa |
|---|---|---|---|---|---|---|
| Verco $B_4C$ | 2.520 | 392.36 ± 58.36 | 2.73 ± 0.16 | 2946.30 ± 62.57 | 2215.20 ± 89.55 | 454.226 |
| PAD-$B_4C$ | 2.505 | 397.96 ± 33.51 | 2.90 ± 0.39 | 2632.40 ± 111.68 | 2019.90 ± 60.24 | 445.514 |
| Verco SiC | 3.196 | 486.93 ± 103.97 | 2.48 ± 0.38 | 2628.30 ± 44.13 | 2098.50 ± 24.87 | 434.372 |
| SiC-N LA3 | 3.201 | 578.30 ± 26.69 | 4.49 ± 0.24 | — | 1959.30 ± 30.43 | 443.597 |
| Hexology Enh. | 3.153 | 458.97 ± 43.40 | 2.73 ± 0.43 | 2308.10 ± 87.96 | 1975.90 ± 57.53 | 431.702 |

Discussion

Both the Verco and PAD-$B_4C$ specimens showed a graphite second phase and the PAD-$B_4C$ sample contained alumina as well. Based on a theoretical density for pure boron carbide of 2.52 g/cm$^3$, the relative densities of Verco and PAD-$B_4C$ were 100% and 99.4%, respectively. Similarly, neglecting the carbon content in SiC (the density of pure hexagonal SiC is 3.217 g/cm$^3$) the relative densities of Verco SiC, Hexyloy Enhanced SiC, and SiC—N, were 99.3%, 98.0%, and 99.5%, respectively.

than plastic deformation. Lower loads give a truer picture of the specimen's resistance to localized plastic flow. Under these conditions; however, accurate measurement of indent dimensions becomes more difficult.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

The invention claimed is:

1. A method for fabricating a silicon carbide (SiC) body comprising:
   forming a green body from SiC particles that are coated with silicon dioxide ($SiO_2$) and a reducing agent;
   pressureless sintering said green body to obtain a first sintered body having open channels leading to open pores in said first sintered body;
   thermally oxidizing exterior surfaces of said first sintered body to obtain a SiC body having a coating comprising $SiO_2$; and
   hot isostatically pressing (HIPing) said SiC body having said coating to obtain a second sintered body having a relative density of at least 99%, wherein said coating is effective as a liquid encapsulant during HIPing.

2. The method of claim 1, wherein said reducing agent comprises carbon.

3. The method of claim 1, wherein said oxidizing is carried out in air.

4. The method of claim 1, wherein said reducing agent comprises phenolic resin.

5. The method of claim 4, further comprising applying a pyrolysis step prior to pressureless sintering said green body.

6. The method of claim 5, wherein said forming step comprises spray drying an acqueous suspension of SiC particulates, boron carbide ($B_4C$) particulates, dissolved phenolic resin, and binder to obtain free-flowing granules, uniaxially pressing said granules and then cold isostatically pressing said uniaxially pressed granules.

7. The method of claim 1, wherein said first sintered body has a relative density of at least 96%.

8. The method of claim 7, wherein said pressureless sintering is carried out at a pressureless sintering soak temperature above 2000° C. but below 2100° C.

9. The method of claim 1, wherein said pressureless sintering is carried out at a pressureless sintering soak temperature above 2000° C. but below 2100° C.

10. A method for the synthesis of a silicon carbide body comprising:
    pressureless sintering a green body comprised of silicon carbide and graphite to obtain a pressureless sintered silicon carbide body having a relative density above 96% and channels leading to open pores in its body from its exterior surface;
    thermally oxidizing said pressureless sintered silicon carbide body to obtain a coated SiC body having a coating comprised of $SiO_2$; and
    hot isostatically pressing said coated pressureless sintered silicon carbide body to obtain a sintered body having a relative density above 99%, wherein said coating serves as an effective liquid encapsulant during HIPing.

11. The method of claim 10, wherein said silicon carbide body is pressureless sintered at a temperature above 2000° C. but below 2100° C.

* * * * *